Patented Oct. 10, 1922.

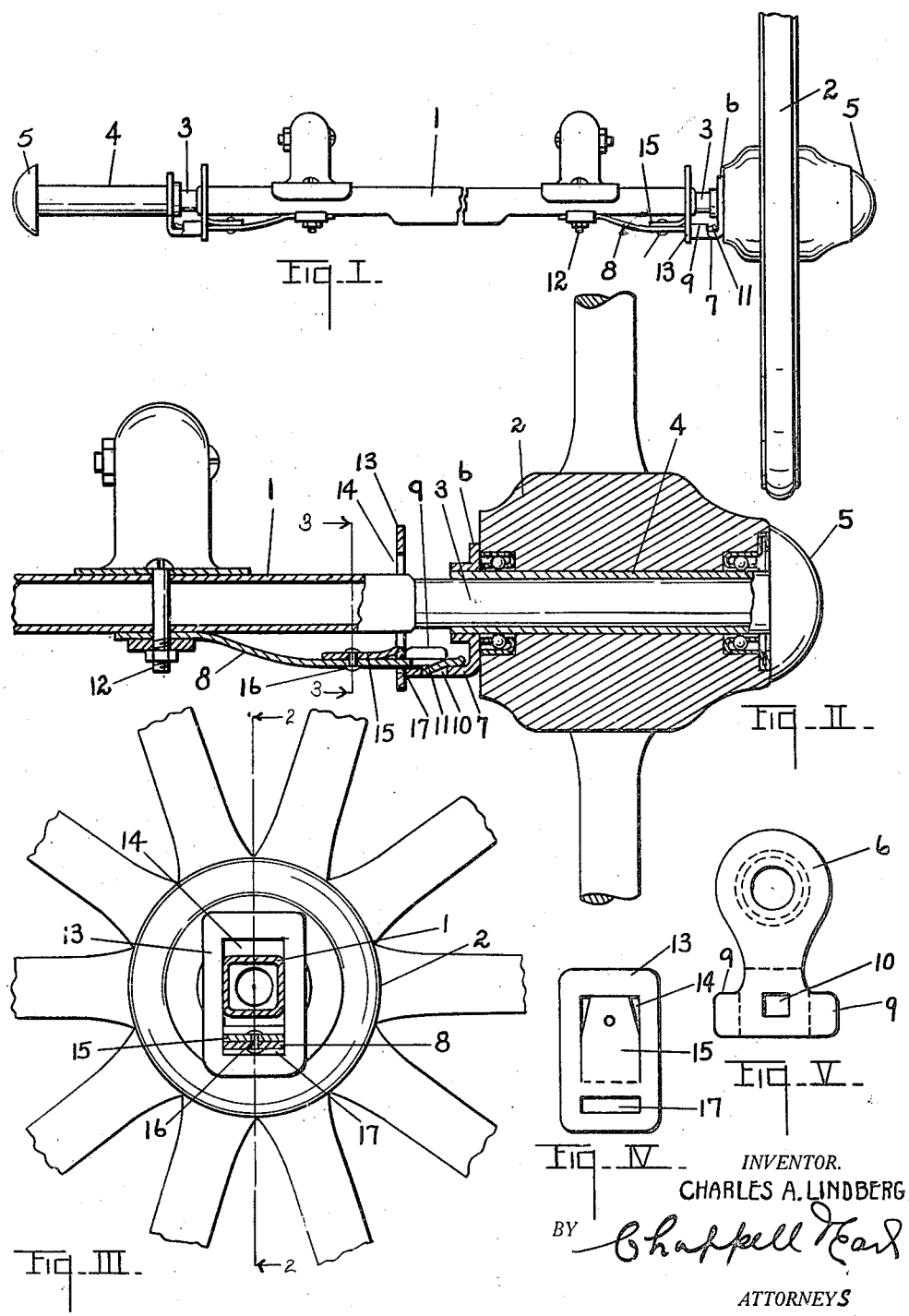

1,431,242

UNITED STATES PATENT OFFICE.

CHARLES A. LINDBERG, OF STURGIS, MICHIGAN, ASSIGNOR TO STURGIS GO-CART CO., OF STURGIS, MICHIGAN.

WHEEL RETAINER.

Application filed December 31, 1921. Serial No. 526,320.

*To all whom it may concern:*

Be it known that I, CHARLES A. LINDBERG, a citizen of the United States, residing at city of Sturgis, county of St. Joseph, State of Michigan, have invented certain new and useful Improvements in Wheel Retainers, of which the following is a specification.

This invention relates to improvements in wheel retainers.

The main objects of this invention is to provide an improved wheel retainer for children's carriages and the like which effectively retains the wheel and at the same time permits it being quickly disengaged and is also neat and attractive in appearance.

Further objects and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings, forming a part of this application, in which:

Fig. I is a fragmentary view of an axle and a wheel of a child's carriage embodying the features of my invention.

Fig. II is a detail view partially in vertical, longitudinal section on a line corresponding to line 2—2 of Fig. III.

Fig. III is a vertical transverse section on a line corresponding to line 3—3 of Fig. II.

Fig. IV is a plan view of a blank from which the latch retaining yoke is formed.

Fig. V is a plan view of a blank from which the wheel retaining collar is formed.

In the drawings, similar reference characters refer to similar parts throughout the several views, and the sectional views are taken looking in the direction of the little arrows at the ends of the section lines.

Referring to the drawings, 1 represents an axle, 2 a wheel of a child's carriage for which my improvements in the embodiment illustrated are particularly designed. The axle is provided with spindles 3. The wheel is mounted upon the bearing sleeve 4, the wheel being secured to this sleeve by the end cap 5 and the collar 6, so that the wheel is removed with the sleeve. The collar 6 is provided with an inwardly projecting arm 7 constituting a keeper with which the retaining latch 8 engages. This keeper arm 7 has upturned flanges 9 on its side edges, the end of the latch lying between these flanges. The arm 7 has a hole 10 therein which is engaged by a lug-like detent 11 struck downwardly from the latch as shown in Fig. II.

The latch 8 is formed of spring material or is resilient so that it engages and rests upon the keeper under spring tension. The latch is secured to the under side of the axle by means of the bolt 12, its free end being supported against lateral movement by the yoke 13 having a hole 14 therein through which the axle extends. This yoke is a sheet metal stamping, the part struck out from the hole 14 constituting an attaching arm 15 secured to the latch by the rivet 16, a hole 17 being formed in the yoke to receive the latch thereby affording a very secure attachment for the yoke to the latch by means of this single rivet.

When it is desired to release the wheel the latch 8 is lifted up sufficiently to disengage the detent 11 from the keeper arm when the sleeve with the wheel thereon may be withdrawn. In replacing it is only necessary to push the sleeve upon the spindle positioning the keeper so that it is engaged by the latch. The engagement of the parts under the spring pressure prevents rattling and frictional wear. The inner end of the arm 7 engaging the yoke limits the inward movement of the sleeve upon the spindle.

With the parts thus formed and arranged they are simple and economical to produce and easily and quickly assembled, and when assembled are very secure. The structure is attractive in appearance.

Having thus described my invention, what I claim as new and desire to secure by Letters Patent, is:—

1. The combination with an axle provided with a spindle, of a removable wheel bearing sleeve provided with wheel retaining means and with an inwardly projecting keeper arm having upturned flanges on its side edges and a hole therein, a spring latch secured at its inner end on the under side of said axle with its outer end resting on said arm between its said flanges and having a detent lug struck downwardly therefrom engaging said hole in said arm, and a yoke mounted on the outer end of said latch and embracing said axle supporting said latch laterally, the end of said arm being in engagement with said yoke when the latch is engaged with the keeper arm.

2. The combination with an axle provided with a spindle, of a removable wheel bearing sleeve provided with wheel retaining means and with an inwardly projecting keeper arm having upturned flanges on its side edges and a hole therein, and a spring latch secured at its inner end on the under side of said axle with its outer end resting on said arm between its said flanges and having a detent lug struck downwardly therefrom engaging said hole in said arm.

3. The combination with an axle provided with a spindle, of a removable wheel bearing sleeve provided with wheel retaining means and with an inwardly projecting keeper, a spring latch secured at its inner end to said axle with its outer end detachably engaging said keeper, and a yoke mounted on the outer end of said latch and embracing said axle and supporting said latch laterally.

4. The combination with an axle provided with a spindle, of a non-rotatable removable wheel bearing sleeve provided with wheel retaining means and with an inwardly projecting keeper, and a spring latch secured at its inner end to said axle with its outer end detachably engaging said keeper.

5. The combination of an axle provided with a spindle, of a wheel bearing sleeve provided with wheel retaining means and with an inwardly projecting keeper arm having an upturned side flange, and a latch secured at its inner end to said axle with its outer end detachably engaging said keeper arm, said latch retaining said sleeve upon said spindle and supporting it against rotation thereon.

In witness whereof, I have hereunto set my hand and seal.

CHARLES A. LINDBERG. [L. S.]